M. SWEET.
Curry Comb.
No. 55,553.
Patented June 12, 1866.
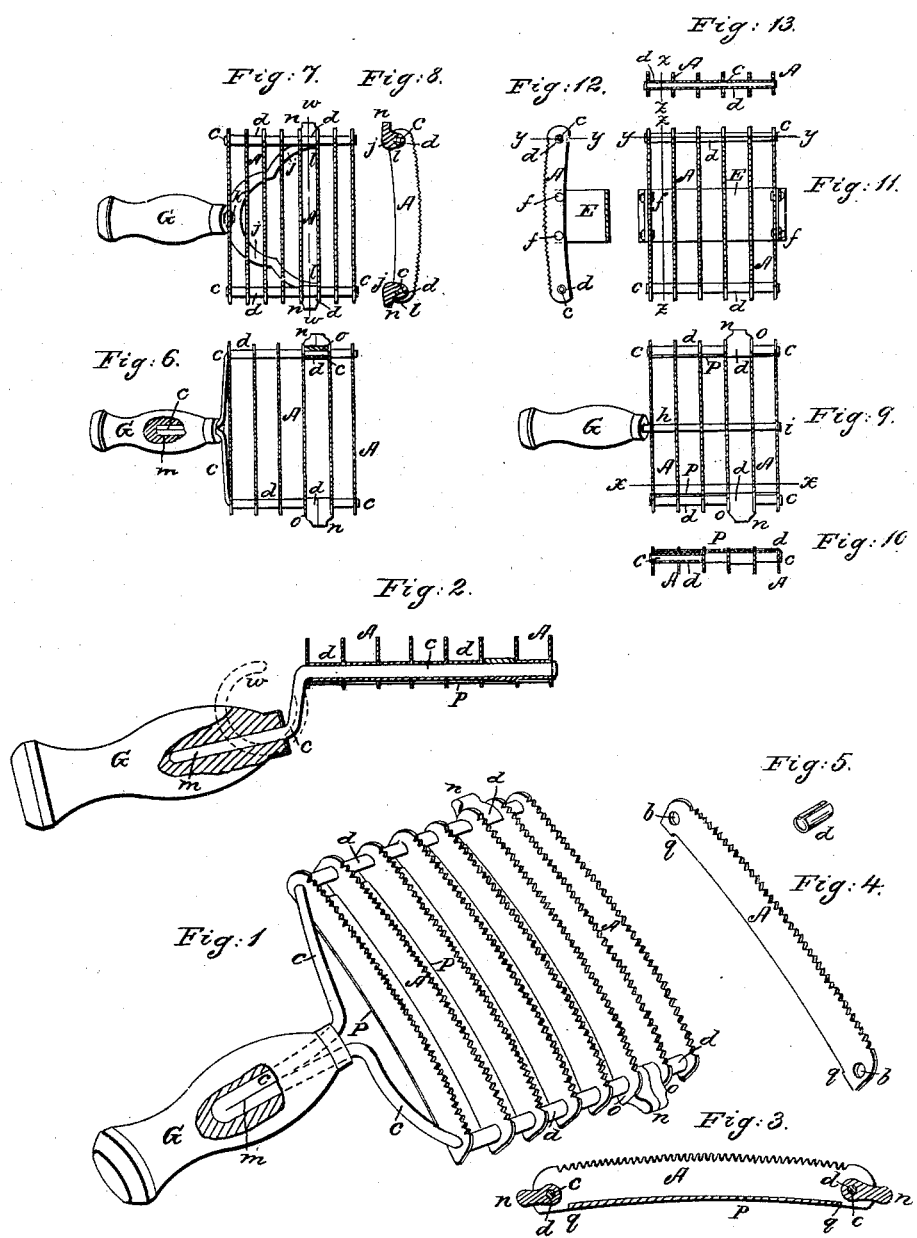
Witnesses:
Michael J. Manning
Austin Ford Park
Inventor:
Miles Sweet

UNITED STATES PATENT OFFICE.

MILES SWEET, OF TROY, NEW YORK.

IMPROVEMENT IN CURRY-COMBS.

Specification forming part of Letters Patent No. 55,553, dated June 12, 1866.

*To all whom it may concern:*

Be it known that I, MILES SWEET, of the city of Troy, in the county of Rensselaer and State of New York, have invented certain new and useful Improvements in Curry-Combs, of which the following is a full and exact description, reference being had to the accompanying drawings, in which—

Figure 1 is a perspective view of a curry-comb embodying the whole of my said invention, and Figs. 2 and 3 are sections, and Figs. 4 and 5 perspective views, of parts of the same curry-comb, and Figs. 6, 7, 8, 9, 10, 11, 12, and 13 are plans and sections of other curry-combs, in which one or more parts of my said invention are embodied, like parts of all the curry-combs being marked by the same letters in all the figures.

One part of my invention consists in making a curry-comb with a series of perforated comb-bars fastened together, but apart, and with their sides opposite and parallel, or nearly so, to each other, by means of rivet bolts or rods extended through the said perforated comb-bars and through tubes, blocks, or collars between and against the sides of the said comb-bars, so that the comb-bars shall be thereby firmly and permanently fastened together without any possibility of the rivet-rods getting sprung or forced sidewise out of the ends of the comb-bars in using the curry-comb, and so that a very strong, light, cheap, and durable curry-comb can be thus produced with single comb-bars and with an open back, or with very little obstruction between the sides of the comb-bars.

This part of my invention is embodied in each of the curry-combs shown by the aforesaid drawings, wherein A A are the comb-bars; b b, Fig. 4, the perforations in the comb-bars; c c, the rivet-bolts, and d d the tubes, blocks, or collars between the comb-bars.

In carrying the aforesaid part of my invention into operation or practice, I make the curry-comb with any suitable number and form of comb-bars, A, each having at least two perforations, b, Fig. 4, for the rivet-rods c, and make the intervening tubes, blocks, or collars d of any suitable size, shape, and construction—as for example, by turning or bending rectangular pieces of sheet metal into tubular forms, as indicated by Fig. 5, or by making the tubes, blocks, or collars of solid pieces of metal with holes or openings for the rods c drilled, punched, or cast in or through them, as indicated in Figs. 3 and 8.

I make the curry-comb either with or without a handle, or with a handle attached in any suitable manner, in carrying out the aforesaid part of my invention. Thus, for illustration, in Fig. 11, of which Fig. 12 is a section at the line z z and Fig. 13 at y y, the curry-comb has no handle, but a hand-strap, E, riveted at f f to the outer comb-bars, and in Fig. 9, of which Fig. 10 is a section at the line x x, a handle, G, is fast on a shank, h, which extends through all the comb-bars and is riveted to the outer one at i, and in Fig. 7, of which Fig. 8 is a section at the line w w, a handle, G, is fast on a shank of a frame, j, which is riveted at k to the inside comb-bar, and is over the backs of the comb-bars and extended in between two of the latter, at l l, and there forms two of the blocks or collars which keep apart the comb-bars, and through which the rivet-rods c c extend.

Another part of my invention consists in making a curry-comb with a series of perforated comb-bars fastened together by rivet-rods, which are not only extended through the perforated comb-bars, and tubes, blocks, or collars between the comb-bars, substantially as hereinbefore described, but which are also extended and brought together outside of the said comb-bars in such a manner that the said rivet-rods themselves there form a shank for a handle to the curry-comb.

This part of my invention is shown embodied in the curry-combs represented in Figs. 1, 2, and 6, wherein a handle, G, is fast on a shank, m, formed by the outwardly-extended portions of the rivet-rods c c, which extend through and hold together the comb-bars A and collars d d, the said rivet-rods being shown in separate pieces in Fig. 6 and in one piece in Fig. 1; but I wish it distinctly understood that it is absolutely essential to this part of my invention that the rods or wire c c should not only form a shank for a handle, but should also serve to fasten a series of comb-bars, A, together by extending through holes b, Fig. 4, in the said comb-bars, and through intervening collars d d in the particular manner which is the subject of the first aforesaid part of my invention; for it is not new to make a shank for a handle on a curry-comb by bending and doubling together the middle portion of a rod or wire, of which the two end portions are extended across and fastened to or within the ends of the frame or body of a curry-comb having a series of trough-shaped comb-bars with projecting ends riveted to transverse folded strips of metal which receive the end portions of the rod or wire. In Fig. 2 the dotted lines $v$ represent the outwardly-extended portions of the rivet-rods, bent into a loop or rest for the thumb of a person using the curry-comb.

Another part of my invention consists in making a curry-comb with a series of perforated comb-bars fastened together by rivet-rods extended through the comb-bars and intervening collars, substantially as hereinbefore described, with one or more of the said collars extended beyond the ends of the comb-bars in such manner that the said extended collar or collars shall not only serve to hold the contiguous comb-bars apart, but shall also constitute a guard or guards to prevent the battering or injuring of the ends of the comb-bars when the curry-comb shall be struck edgewise against the floor or side of a stable or anything solid, as is commonly done to jar dirt and hair out of curry-combs in using and cleaning them.

This part of my invention is embodied in the curry-combs shown by Figs. 1, 3, 6, 7, 8, and 9, in each of which two of the collars, tubes, or blocks $d$, that are clamped and held between the perforated comb-bars A by the rivet-rods $c$, are shown extended at $n$ $n$, beyond the ends of the said comb-bars, the said extended collars being shown at $o$ in Figs. 1, 6, and 9 projecting over the ends of the comb-bars, and in Fig. 7 fast on a back frame, $j$, to insure the retention of the extended collars in proper positions.

Another part of my invention consists in making a curry-comb with a series of single comb-bars perforated and fastened together by rivet-rods extended through the comb-bars and intervening blocks, tubes, or collars, substantially as hereinbefore described, and with a back plate secured to and against the rear edges of the said comb-bars, so as to thereby form from single comb-bars a curry-comb with a closed back, and with the comb-bars not wholly or mainly dependent on the back plate for their support, but with the back plate helping the rivet-rods and collars to give strength and firmness to the curry-comb.

This part of my invention is embodied in the curry-combs shown by Figs. 1, 2, 3, 9, and 10, wherein P is the back plate, fastened at its edges by overreaching or rivet projections $q$ $q$, Figs. 3 and 4, on the rear edges of the perforated comb-bars A, which are fastened together by rods $c$ $c$, which are extended through and riveted tight upon the said comb-bars and intervening collars, blocks, or tubes $d$.

What I claim as new and of my invention in curry-combs, and desire to secure by Letters Patent, is—

1. A series of comb-bars, A, formed with perforations $b$, and fastened together by collars $d$ and rivet-bolts $c$, extended through the said collars and comb-bars, substantially as herein described.

2. A series of perforated comb-bars, A, fastened together by rivet-rods $c$ and collars $d$, and with the rivet-rods forming a shank, $m$, for a handle, substantially as herein described.

3. A series of perforated comb-bars, A, fastened together by rivet-rods $c$ and collars $d$, and having one or more of the collars extended beyond the ends of the comb-bars, substantially as herein described.

4. A series of single perforated comb-bars, A, fastened together by rivet-rods $c$ and collars $d$, and having a back plate, P, secured to the said comb-bars, substantially as herein described.

MILES SWEET.

Witnesses:
MICHAEL J. MANNING,
AUSTIN F. PARK.